United States Patent [19]
Sun et al.

[11] Patent Number: 5,790,196
[45] Date of Patent: Aug. 4, 1998

[54] ADAPTIVE VIDEO CODING METHOD

[75] Inventors: Huifang Sun, Cranbury, N.J.; Anthony Vetro, Staten Island, N.Y.

[73] Assignee: Mitsubishi Electric Information Technology Center America, Inc., New Providence, N.J.

[21] Appl. No.: 800,880

[22] Filed: Feb. 14, 1997

[51] Int. Cl.[6] .............................. H04N 7/12; H04N 11/02; H04N 11/04
[52] U.S. Cl. ...................... 348/419; 348/415; 382/239; 382/251
[58] Field of Search ..................... 348/27, 404, 405, 348/409–412, 415, 419; 382/190, 232, 236, 238, 242, 243, 248, 251, 239; 341/200; 375/245; H04N 7/12, 11/02, 11/04

[56] References Cited

U.S. PATENT DOCUMENTS

| | | | |
|---|---|---|---|
| 5,565,921 | 10/1996 | Sasaki et al. | 348/409 |
| 5,638,125 | 6/1997 | Jeong et al. | 348/405 |
| 5,638,126 | 6/1997 | Lim | 348/405 |
| 5,677,969 | 10/1997 | Auyeung et al. | 348/239 |
| 5,686,963 | 11/1997 | Uz et al. | 348/404 |
| 5,706,367 | 1/1998 | Kondo | 348/415 |

*Primary Examiner*—Tommy P. Chin
*Assistant Examiner*—Nhon T. Diep
*Attorney, Agent, or Firm*—Kenneth R. Schaefer

[57] ABSTRACT

Methods of adaptively encoding a sequence of frames of image information representing multiple video objects in which the video object information is digitally encoded as to texture, motion and shape characteristics to produce code bits at a variable rate for transmission via a buffer having a fixed bit rate output, and a target number of bits is estimated for encoding video objects in a video object plane and the target is distributed and quantization parameters are adjusted according to header bits associated with a previous frame.

10 Claims, 7 Drawing Sheets

*GROUP I*

*GROUP 2*

*GROUP 4*

FIGURE 8

*GROUP 5*

ADAPTIVE VIDEO CODING METHOD

BACKGROUND OF THE INVENTION

1. Field of the Invention

This invention relates to methods of coding video signals for digital storage and/or transmission of such signals using joint rate control for multiple video objects based on a quadratic rate-distortion model.

2. Description of the Prior Art

A basic method for compressing the bandwidth of digital color video signals which has been adopted by the Motion Picture Experts Group (MPEG) utilizes Discrete Cosine Transform (DCT) techniques. In addition, the MPEG approach employs motion compensation techniques.

The MPEG standard achieves high data compression rates by developing information for a full frame of the image only every so often. The full image frames, or intra-coded pictures are called "I-frames", and contain the full frame information independent of any other frames. Between the I-frames, there are so-called B-frames and P-frames which store only image differences which occur relative to reference anchor frames.

More specifically, each frame of video sequence is partitioned into smaller blocks of pixel data and each block is subjected to the discrete cosine transformation function to convert the statistically dependent spatial domain picture elements (pixels) into independent frequency domain DCT coefficients.

That is, the blocks of data, encoded according to intraframe coding (I-frames), consist of matrices of Discrete Cosine Coefficients. Respective 8×8 blocks of pixels are subjected to a Discrete Cosine Transform (DCT) to provide a coded signal. The coefficients are subjected to adaptive quantization, and then are run-length and variable-length encoded. Hence, respective blocks of transmitted data may include fewer than an 8×8 matrix of codewords. Macroblocks of intraframe encoded data will include, in addition to the DCT coefficients, information such as the level of quantization employed, a macroblock address or location indicator, and a macroblock type, the latter information being referred to as "header" or "overhead" information.

Blocks of data encoded according to P or B interframe coding also consist of matrices of Discrete Cosine Coefficients. In this instance however, the coefficients represent residues or differences between a predicted 8×8 pixel matrix and the actual 8×8 pixel matrix. These coefficients are subjected to quantization and run- and variable-length coding. In the frame sequence, I and P frames are designated anchor frames. Each P frame is predicted from the lastmost occurring anchor frame. Each B frame is predicted from one or both of the anchor frames between which it is disposed. The predictive coding process involves generating displacement vectors which indicate which block of an anchor frame most closely matches the block of the predicted frame currently being coded. The pixel data of the matched block in the anchor frame is subtracted, on a pixel-by-pixel basis, from the block of the frame being encoded, to develop the residues. The transformed residues and the vectors comprise the coded data for the predictive frames. As with intraframe coded frames, the macroblocks include quantization, address and type information. The results are usually energy concentrated so that a few of the coefficients in a block contain the main part of the picture information. The coefficients are quantized in a known manner to effectively limit the dynamic range of the coefficients and the results are then run-length and variable-length encoded for application to a transmission medium.

In a recent proposal for implementing the latest coding verification model (VM), which is described in "MPEG-4 Video Verification Model Version 5.0", distributed by Adhoc group on MPEG-4 video VM editing to its members under the designation ISO/IEC JTC1/SC29/WG11 MPEG 96/N1469, November 1996, the contents of which are incorporated herein by reference, representatives of the David Sarnoff Research Center have proposed "A New Rate Control Scheme Using Quadratic Rate Distortion Model". The MPEG-4 video coding format will produce a variable bit rate stream at the encoder from frame to frame (as was the case with prior schemes). Since the variable bit rate stream is to be transmitted over a fixed rate channel, a channel buffer is employed to smooth out the bit stream. In order to prevent the buffer from overflowing or underflowing, rate control of the encoding process is required.

In the recent Sarnoff proposal, before the encoding process begins for a given set of frames (picture), a target bit rate for each frame is calculated to accommodate the fact that the output bit rate from the output of the encoder is constrained to a fixed bit rate while the bit rate resulting from picture encoding can vary over a relatively wide range (if left uncorrected), depending on the content of the image frame. According to the proposal, the distortion measure associated with each frame is assumed to be the average quantization scale of the frame and the rate distortion function is modeled as a second order function of the inverse of the distortion measure. Before the actual encoding process begins the target bit rate of the image is estimated by the number of bits left for coding the group of images, as well as the number of frames still to be encoded. The authors mention implementing their scheme at the picture level and also note a possibility for extending their scheme to the macroblock level.

It has also been known that when a block (macroblock) contains an edge boundary of an object, the energy in that block after transformation, as represented by the DCT coefficients, includes a relatively large DC coefficient (top left corner of matrix) and randomly distributed AC coefficients throughout the matrix. A non-edge block, on the other hand, usually is characterized by a similar large DC coefficient (top left corner) and a few (e.g. two) adjacent AC coefficients which are substantially larger than other coefficients associated with that block. This information relates to image changes in the spatial domain and, when combined with image difference information obtained from comparing successive frames (i.e. temporal differences) factors are available for distinguishing one video object (VO) from another.

Figure 1:
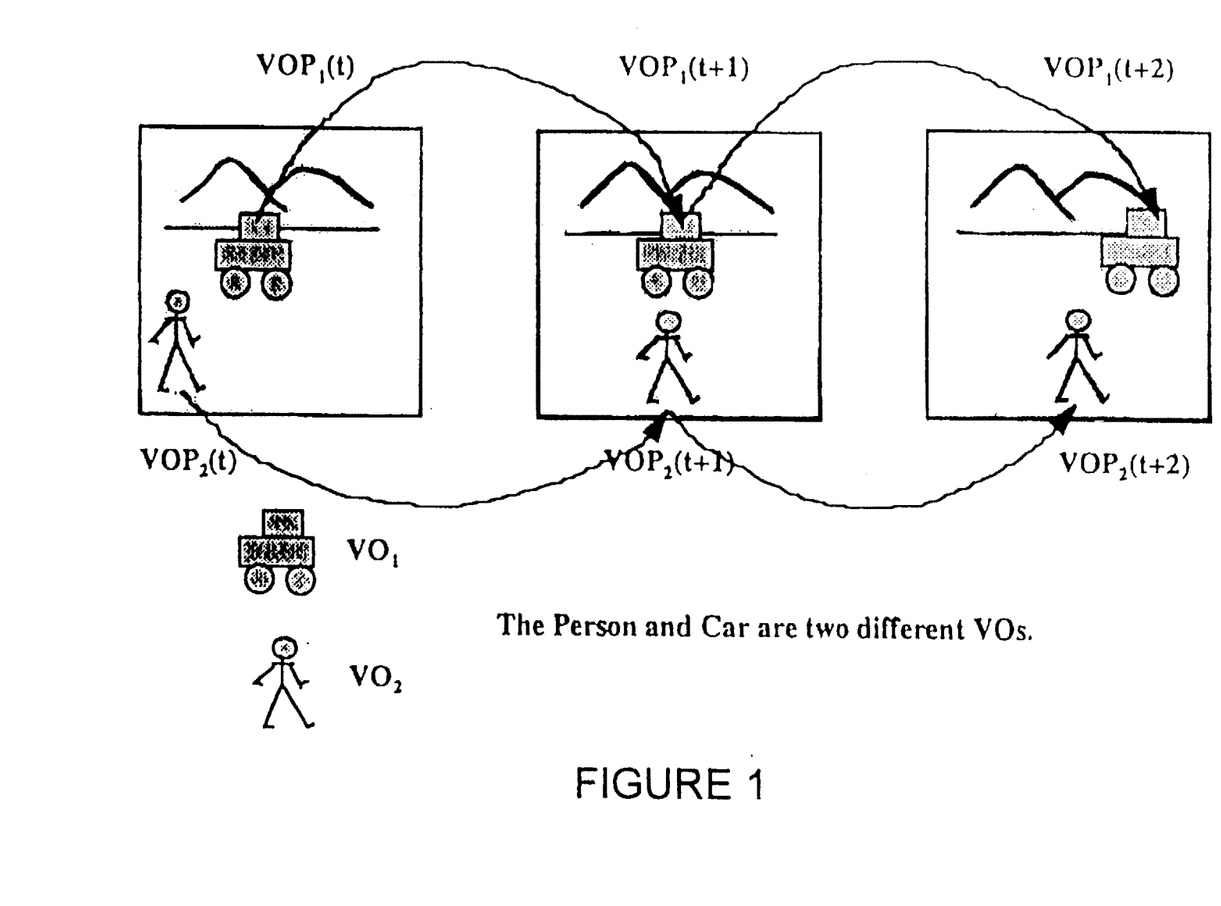
FIG. 1 is a schematic pictorial representation of three successive image frames having two video objects (VO$_1$ and VO$_2$) and a background image, where each of the VO's moves from left to right in the scene over time.

As shown in FIG. 1 (a sample video scene), one or more video objects ($VO_1$, $VO_2$, $VO_i$) may be contained in an image frame or plane (VOP) and, in each successive frame, the relative positioning of video objects may be expected to change, denoting motion. At the same time, this motion assists in defining the objects.

Under the MPEG-4 VM, additional objectives of content-based manipulation and independent bit stream coding have been imposed to provide added functionality at the decoder end of the system. The MPEG-4 objective complicates and imposes additional processing requirements on the process of predicting target bit rates for each frame as a result of the added overhead information such as the coding of shape information within the MPEG-4 encoder. The foregoing characteristics of the MPEG-4 VM, as well as information regarding identification of individual VO's is explained in greater detail in the above-referenced manual.

It is an object of the present invention to provide an adaptive video coding method which is particularly suitable for MPEG-4 encoder and other encoding schemes.

It is a further object of the present invention to provide an adaptive video coding method for use in accordance with MPEG-4 VM wherein individual video objects (VO's) are taken into account in providing an improved bit rate control system based on a quadratic rate distortion model.

SUMMARY OF THE INVENTION

In accordance with the present invention, a method is described which achieves a constant bit rate output when coding multiple video objects. This implementation makes use of a quadratic rate-distortion model. Each object maintains its own set of parameters. With these parameters, an initial target bit estimate is made for each object after a first frame is encoded. Based on output buffer fullness, the total target is adjusted and then distributed proportional to the amount of header bits used in the previous corresponding object. Based on the new individual targets and second order model parameters, appropriate quantization parameters can be calculated for each video object. This method assures that the target bit rate is achieved for low latency video coding.

In order to provide a suitable bit rate control system based on a quadratic rate-distortion model, it has been found that control information may be applied jointly with respect to video objects (VO's), rather than entire frames.

DETAILED DESCRIPTION

Figure 2:
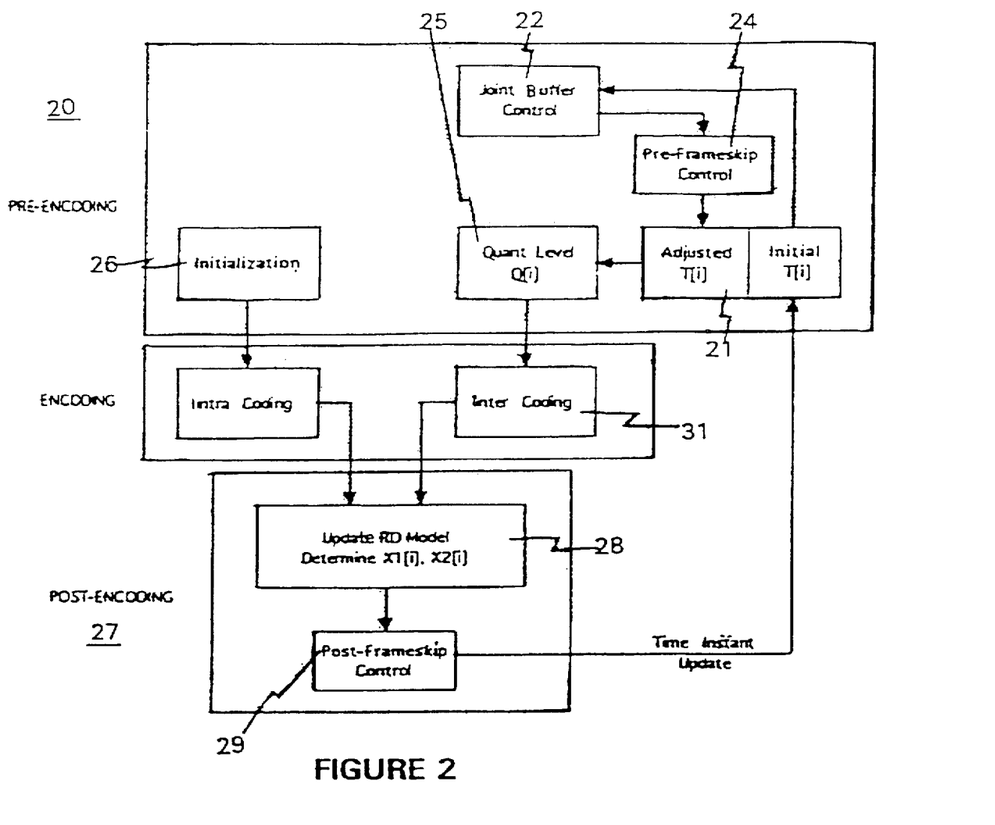
FIG. 2 is a block diagram illustrating steps in the method according to this invention, along with the interrelationships among such steps.
Figure 3:
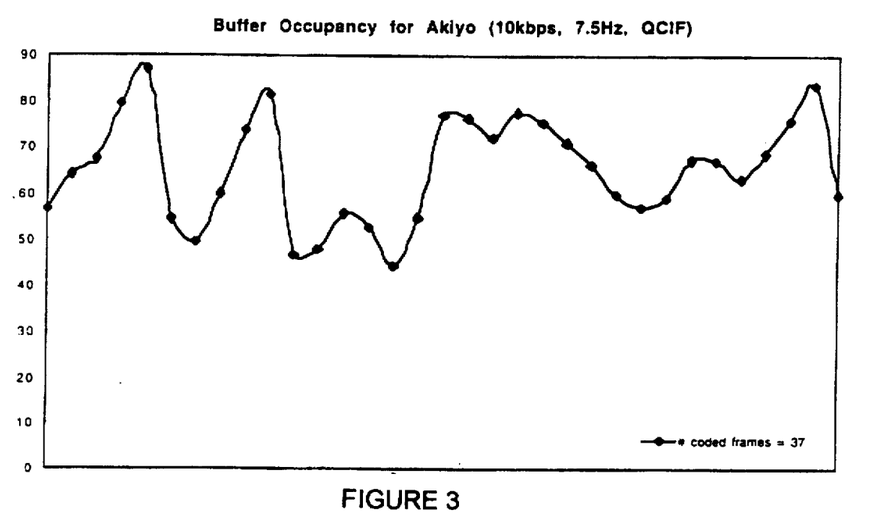
FIGS. 3–9 are a set of plots of buffer occupancy (bits) versus frame for a series of video signal sequences representative of particular named images encoded in accordance with the present invention.
Figure 4:
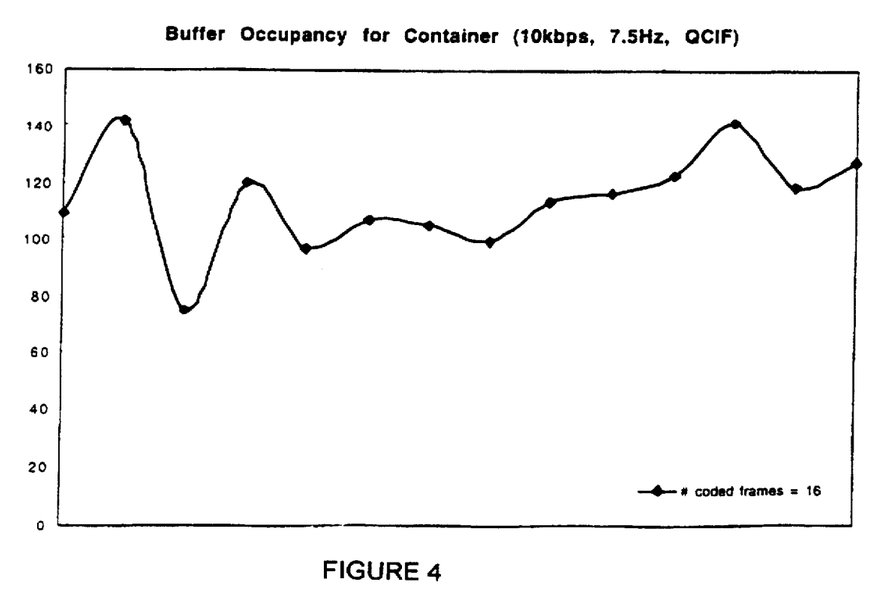
Figure 5:
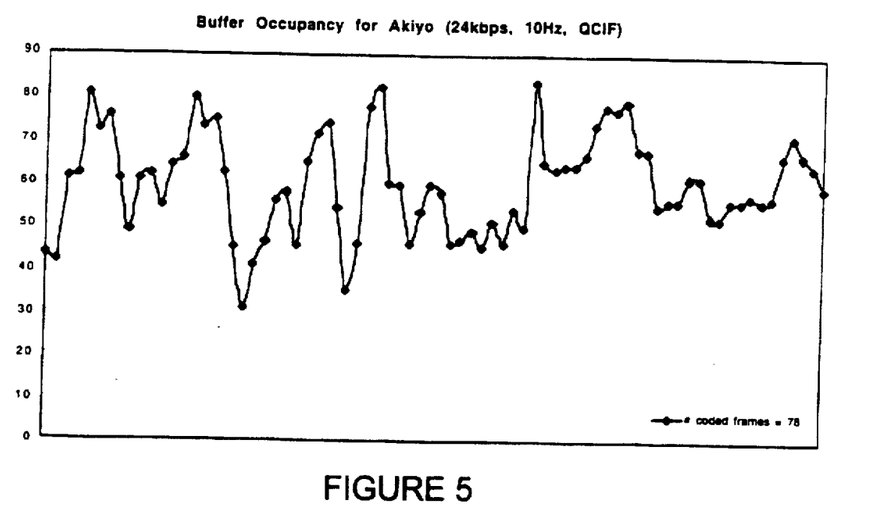
Figure 6:
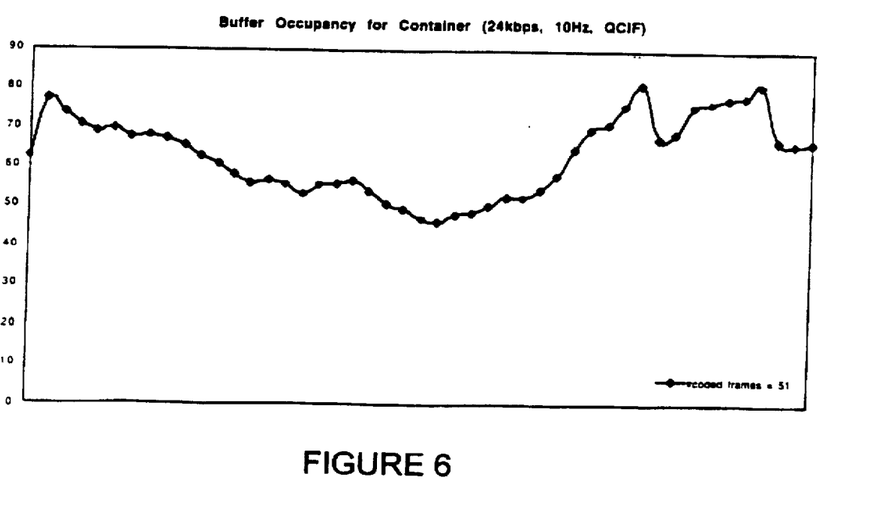
Figure 7:
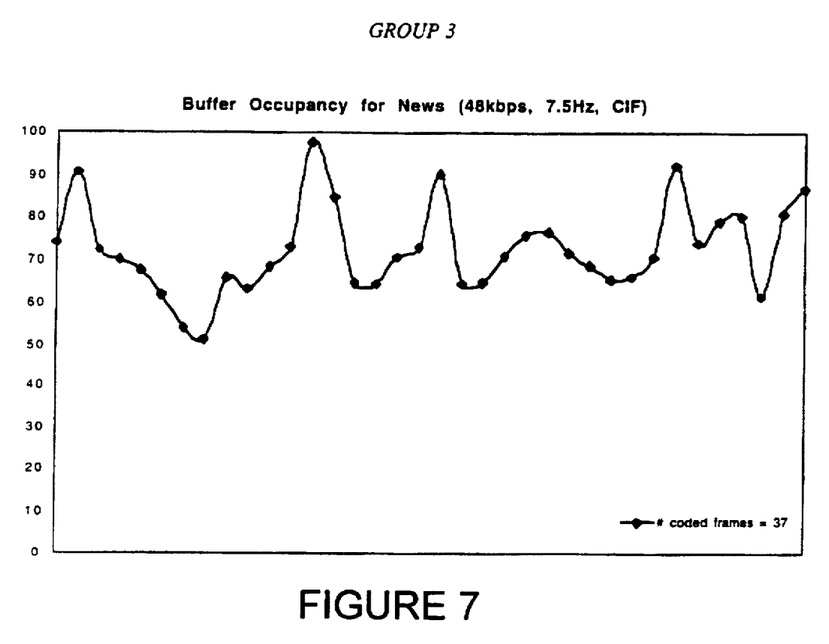
Figure 8:
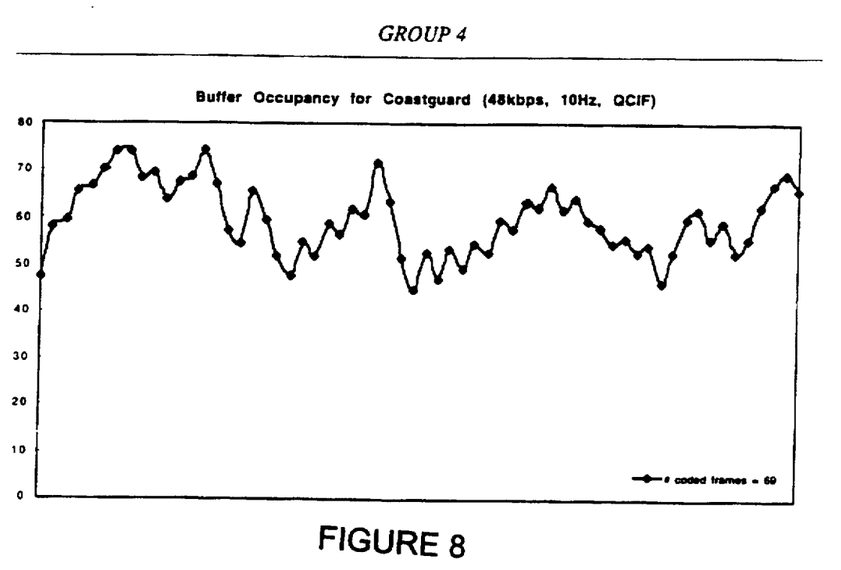
Figure 9:
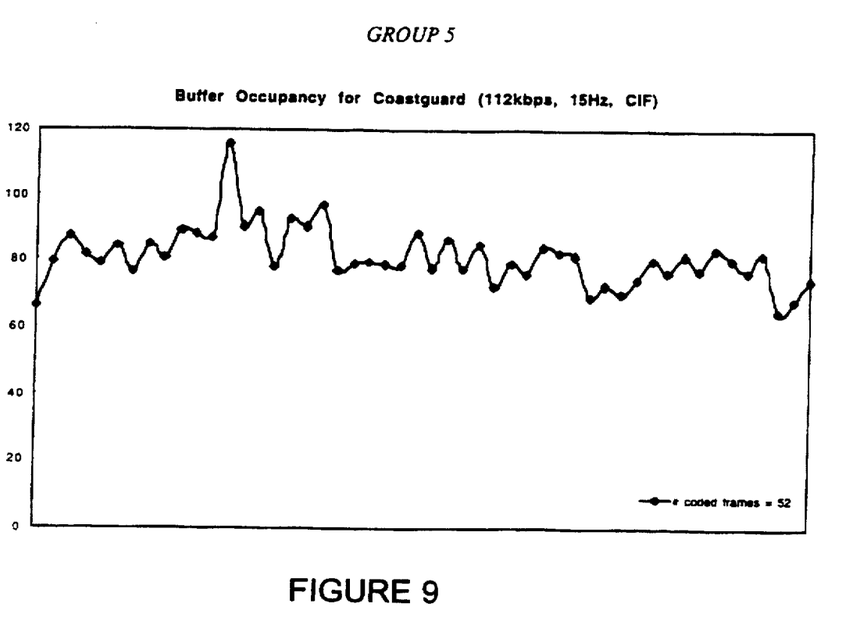

The method for performing joint bit rate control can be decomposed into a pre-encoding stage and a post-encoding stage. As shown in FIG. 2, a pre-encoding stage 20 comprises (i) target bit estimation 21, (ii) joint buffer control 22, (iii) a pre-frameskip control 24, and (iv) a quantization level calculation 25. The post-encoding stage 27 comprises (i) updating the rate-distortion model 28, and (ii) a post frameskip control 29. An important aspect of this scheme, not evident from the block structure, is that most blocks require previous operations to be complete for every video object (VO). For instance, inter-coding 31 of the next VO to be coded will not begin until all quantization levels for preceding VO's have been calculated. In this embodiment, all the VO's are coded at the same frame rate. However, many of the aspects of the current implementation anticipate a migration towards different frame rate for each VO. However, a more complex buffer control will be required.

In a preferred embodiment of the present invention, an adaptive video encoder (FIG. 10) is arranged to follow the method illustrated in FIG. 2. A Digital Image Source 10 provides image information on a frame basis or on a Video Object (VO) basis to a video signal encoder 12 in digitized form. The image is partitioned into spatially non-overlapping blocks of pixel data. The customary block size of 8×8 pixels may be employed. Each partitioned block is then processed.

Figure 10:
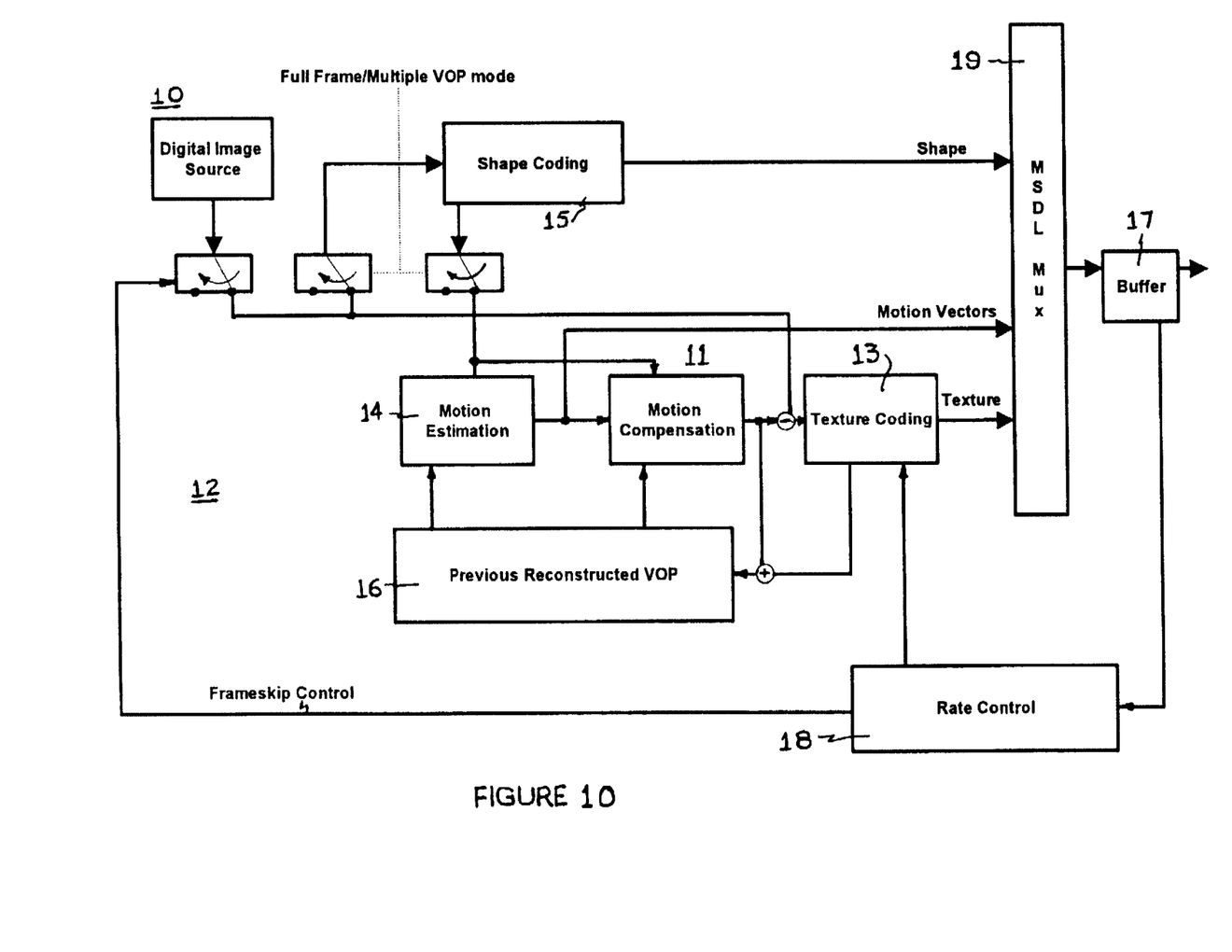
FIG. 10 is a block diagram of an MPEG-4 encoder which has been modified to implement the present invention.

A motion estimator 14 is used to estimate a motion vector for the input block with reference to a temporally close reference frame stored in a frame memory (previously reconstructed VOP 16). The reference frame may be an original unprocessed frame or a previously coded frame. Bi-directional motion estimation such as that described in the MPEG standards can also be applied.

A motion compensation block 11, a texture coding block 13, a shape coding block 15, a constant output bit rate buffer 17 and an MSDL multiplexer 19, all arranged as described in the MPEG-4 reference document, are provided. In addition, a rate control system 18 (as described in connection with FIG. 2) is provided to perform added functions according to this invention.

Referring again to FIG. 2, the pre-encoding stage 20 further includes Initialization 26 (see Table I below).

A. Initialization 26

In this section, most rate control variables (e.g., first and second order complexities, MAD) have been extended to vectors so that each VO can carry its own separate information. Among those that have not been changed are the remaining number of bits for the segment and the rate of buffer drain. Table 1 summarizes the notations used to describe the method.

TABLE 1

Notation used for joint rate control based on quadratic rate-distortion model.

| VARIABLES | DESCRIPTION |
| --- | --- |
| Buff_drain | Number of bits to be removed from the buffer per picture |
| MAD[i] | Mean absolute difference for current VO after motion compensation |
| X1[i], X2[i] | First and second order complexity measures |
| Q[i] | Quantization parameter for ith VO |
| N_skip_post | Number of frames to skip according to post-frameskip |
| N_skip_pre | Number of frames to skip according to pre-frameskip |
| N_skip | Total number of frames to be skipped |
| N_btwn | Number of frames between encoded frames |
| B_left | Number of bits left for coding the sequence |
| T_texture[i] | Texture bit count for ith VO |
| T_texture | Total texture bit count (all VOs) |
| T[i] | Bit count for ith VO including texture, shape, motion and header bits |
| T | Total bit count including texture, shape, motion and header bits (all VOs) |
| H[i] | Header bit count including shape and motion |
| H | Total header bit count (all VOs) |
| Buff_size | Size of buffer |
| Buff_level | Current fullness of buffer |

B. Post-Encoding Stage 27

After the encoding stage 30, the parameters for the rate-distortion model must be sought. For multiple-VO, the encoder rate-distortion function is modeled as:

$$T_{texture} = \Sigma_{all\,VO} \left\{ \frac{X1_i \cdot MAD_i}{Q_i} + \frac{X2_i \cdot MAD_i}{Q_i^2} \right\}$$

From the above equation, the model parameters, $X1_i$ and $X2_i$, can be calculated separately for every VO. In the above equation, the target value, T_texture, is decomposed into multiple T_texture$_i$, which corresponds to the amount of bits used for coding the texture component only of the ith VO.

Referring to FIG. 2, the next step in the post encoding stage 27 is the post-frame skip control function 29. At this point the buffer 17 has been updated. Overflow is prevented by checking the current buffer level against a skip margin, γ. If the current buffer level is above the designated margin, frames are continually skipped, i.e., N_skip_post is incremented, until the following criteria is met:

Buff_level−N_skip_postBuff_drain<(1−γ)Buff_size

In a preferred arrangement, γ is chosen to equal 0.2. After the condition of the equation above has been satisfied and N_skip_post has been found, the value of N_skip_pre is added to it. The determination of N_skip_pre will be discussed shortly. The final value, N_skip=N_skip_pre+N_skip_post, is equal to the total frames to be skipped. It is this value which determines the new time instant. Note that the time instant can only be updated after the post-frameskip control function occurs.

Proceeding with the next pre-encoding stage, the initial target bit rate is calculated based on the number of available bits for the segment and the number of bits used in the previous corresponding VO. A similar lower bound to the frame-based simulation is used so that minimum quality is guaranteed.

T[i]=Max {B_left/(30*numVOs),B_left/(numVOleft[i]*num-VOs)}T[i]=T[i]*(1−α)+B_past[i]*α

The weighting α represents a contribution from the past frame and is set to 0.2 in the current implementation.

Once the initial target has been set, adjustments based on the buffer 18 fullness are made according to, T=T*(2a+b)/(b+2a), where a=Buff_level and b=Buff_size−Buff_level. Note that this target rate represents the sum of all individual target rates. Further changes are made based on the expected effect of the target with respect to the current and future buffer 18 level. Denoting a safety margin by δ, we increase the target by, T_inc=Buff_drain−T−Buff_level+δ·Buff_size if Buff_level−Buff_drain+T<δ·Buff_size On the other hand, we decrease the target by, T_dec=Buff_level+T−(1−δ)·Buff_size if Buff_level+T>(1−δ)·Buff_size.

The operations described above are part of the joint buffer control. In the current implementation, δ is set to 0.1.

The next step is to redistribute the bits so that consistent quality is maintained across different objects. To achieve this, the size of the object and the amount of activity which it is experiencing are obtained from the header information of the previously coded objects. However, before distributing the target, a check is made to determine if the amount of bits used for the header of the previous frame exceed this bit count. The difference, S=T−H, denotes an approximation to the number of bits available for coding the texture of every VO. If s<0, then there may not be enough bits to uniformly code each VO. In this case, all targets are made negative. As is explained later, this forces lower bound constraints on the quantization parameter, thereby limiting the amount of bits spent on the texture. Additionally, if s<0, the pre-frameskip control 24 is invoked. Since the time instant is only updated after the post-encoding stage 27, this frameskip control block serves as a correction towards the next time instant update. When invoked, a non-zero value of N_skip_pre will be determined. This value is determined according to:

```
while(s < 0) {
    increment N_skip-pre
    s = s + Buff_drain
}
```

This combination of making the targets negative and skipping extra frames will allow the rate control algorithm to better estimate the next target while providing uniform object quality.

In the event that s>0, the total target, T, is distributed proportional to the header information of the previously coded frame as:

$$T_i = H_i \cdot \left(1 + \frac{s}{H}\right)$$

$T_i = H_i(1 + \frac{s}{H})$

Having a target for each VO, the next task is to determine individual distortion measures which correspond to the desired rate. Treating (1) separately for each VO and normalizing with respect to the MAD, leaves us to solve the classic quadratic: $ax^2+bx+c=0$, where, a=X2$_i$ b=X1$_i$ c=T_texture$_i$/MAD$_i$ Keeping in mind that T_texture$_i$ is a result of subtracting the header bits from the total bits, it is possible to obtain small targets when performing low-bit-rate coding. To overcome this difficulty, we lower bound the target according to:

$$T\_texture_i = Max \left\{ \frac{Buff\_drain}{3 \cdot MAD_i \cdot numVOs}, T\_texture \right\}$$

In the event that the target was negative, the derived quantization parameter is lower bounded by LB_QUANT, otherwise the usual clipping between 1 and 31 is employed. The use of this parameter ensures that a relatively small amount of bits will go to coding the texture. The value of LB_QUANT should chosen to be greater than 25. As an alternative, we may decrease the amount of bits spent on shape coding by reducing the resolution of the alpha-plane before coding.

EXPERIMENTAL RESULTS

The table below summarizes the testing groups for the algorithm described in the preceding section. An initial quantization parameter of 15 was chosen for the I-frame, but thereafter the quantization parameter was automatically determined.

TABLE 2

Testing groups for coding multiple video objects.

| ID | Sequences | Bit Rate (kbps) | Frame Rate (Hz) | Format |
|---|---|---|---|---|
| 1 | Akiyo, Container | 10 | 7.5 | QCIF |
| 2 | Akiyo, Container | 24 | 10 | QCIF |
| 3 | News | 48 | 7.5 | CIF |
| 4 | Coastguard | 48 | 10 | QCIF |
| 5 | Coastguard | 112 | 15 | CIF |

In the coding of multiple VOs, three parameters are coded: shape, motion and texture. The encoder software allows the user to code the parameters in a combined mode or a separate mode; the simulation results presented here employ separate parameter encoding. Table 3 provides details of the PSNR for each VO (Y-component only) and also reports the actual bit rate achieved.

TABLE 3

Table 3 Simulation results of core experiment.

| Sequence | Target Rate | Frame Rate | Format | Y-psnr VO0 | Y-psnr VO1 | Y-psnr VO2 | Y-psnr VO3 | Y-psnr VO4 | Y-psnr VO5 | Actual Rate |
|---|---|---|---|---|---|---|---|---|---|---|
| Akiyo | 10 | 7.5 | QCIF | 35.79 | 27.23 | N/A | N/A | N/A | N/A | 10.03 |
| Container | 10 | 7.5 | QCIF | 31.96 | 23.76 | 19.98 | 25.56 | 29.60 | 18.87 | 9.90 |
| Akiyo | 24 | 10 | QCIF | 40.42 | 29.82 | N/A | N/A | N/A | N/A | 23.90 |
| Container | 24 | 10 | QCIF | 31.54 | 22.73 | 19.75 | 25.37 | 29.08 | 18.62 | 23.78 |
| News | 48 | 7.5 | CIF | 35.87 | 28.50 | 27.83 | 24.68 | N/A | N/A | 47.08 |
| Coastguard | 48 | 10 | QCIF | 29.09 | 23.15 | 25.96 | 26.40 | N/A | N/A | 47.82 |
| Coastguard | 112 | 15 | CIF | 27.13 | 22.74 | 24.24 | 26.64 | N/A | N/A | 111.94 |

From these results it is evident that the proposed scheme is capable of achieving the target bit rate with satisfactory image quality. However, for low-latency applications we must also prevent the buffer from overflowing. For coding multiple video objects, there is a great deal of overhead information that must be specified. Often, this will leave the encoder with very few bits for coding the texture in each object. As a result, the encoder is forced to skip frames and/or increase the quantization level to maintain a suitable buffer level. Plots illustrating the buffer occupancy are provided in FIGS. 3-9. Additionally, the number of coded frames are specified. For each sequence, 300 frames (10 sec) were coded.

In this report we have presented a means of encoding multiple video objects in a scene based on a quadratic rate-distortion model. The scheme is an enhancement of methods already proven for frame-based encoding simulations. A frame skip control is invoked to assist the buffer from becoming too full. Instances in which the buffer does overflow are indications of an unusually large amount of bits being spent on overhead. To prevent this, reductions can be made in the amount of overhead information (e.g., bits spent on shape).

While the invention has been described in terms of a preferred embodiment, various modifications may be made in details of this implementation without departing from the scope of this invention, which is set forth in the following claims.

What is claimed is:

1. A method of adaptively encoding a sequence of frames of image information, wherein at least some of said frames contain a plurality of video objects, for providing a compressed video signal to a transmission channel by means of a buffer having a variable input bit rate and a substantially constant output bit rate comprising the steps of:

encoding each of said video objects in each of a set of frames using coding means including a processor for performing discrete cosine transform to produce transform coefficients and a quantizer for quantizing the transform coefficients to generate image-representative code bits at a variable rate, said encoding step producing texture, motion and shape information for each said video object;

storing said image representative code bits in said buffer;

restricting the contents of said buffer with respect to a predetermined limit value by adjusting quantization parameters utilized by said quantizer with respect to a reference value according to a quadratic rate distortion model to increase or decrease the amount of code bits generated by said coding means for said video objects in successive ones of said frames;

estimating a target number of bits for encoding each video object in each successive frame following the first frame in a sequence by distributing a target number of bits for all objects in a video object plane among said objects in accordance with a first function of the number of header bits used in connection with corresponding objects in a previous frame; and the adjustment of said quantization parameters being made in accordance with a second function of said number of header bits used for all objects in a previous frame.

2. The method of claim 1 wherein said first function corresponds to a direct proportion between the number of header bits for corresponding objects in a previous frame and the target number of bits in a video object plane.

3. The method of claim 1 wherein said second function corresponds to a difference between the actual number of header bits used for all objects in a previous frame and the total number of target bits available for those objects in an instant frame.

4. The method of claim 1 wherein said method further comprises the step of skipping the coding of a frame for a frame period whenever the difference between buffer bit capacity and current buffer level is less than a predetermined margin at the end of the encoding of all video objects in a frame.

5. The method of claim 2 wherein said margin is of the order of 0.2 times the buffer bit capacity.

6. The method of claim 2 wherein said second function corresponds to a difference between the actual number of header bits used for all objects in a previous frame and the total number of target bits available for those objects in an instant frame.

7. The method of claim 6 wherein said method further comprises the step of skipping the coding of a frame for a frame period whenever the difference between buffer bit capacity and current buffer level is less than a predetermined margin at the end of the encoding of all video objects in a frame.

8. The method of claim 1 wherein said method further comprises the step of skipping the coding of a frame for a frame period whenever said target number of bits for all objects in a video object plane is less than the total number of header bits used in connection with corresponding objects in a previous frame.

9. The method of claim 4 wherein said method further comprises the step of skipping the coding of a frame for a frame period whenever said target number of bits for all objects in a video object plane is less than the total number of header bits used in connection with corresponding objects in a previous frame.

10. The method of claim 8 wherein said method comprises the further step of setting all target bit parameters to a negative level whenever said frame skipping is enabled.

* * * * *